(12) United States Patent
Post et al.

(10) Patent No.: US 8,970,603 B2
(45) Date of Patent: Mar. 3, 2015

(54) DYNAMIC VIRTUAL DEVICE FAILURE RECOVERY

(75) Inventors: Bradley Stephen Post, San Francisco, CA (US); Varadharajan Ponnappan, Sunnyvale, CA (US); Pareekshit Singh, Sunnyvale, CA (US); Vladimir Pavlov, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1084 days.

(21) Appl. No.: 12/895,668

(22) Filed: Sep. 30, 2010

(65) Prior Publication Data

US 2012/0081355 A1  Apr. 5, 2012

(51) Int. Cl.
| | |
|---|---|
| G06F 15/00 | (2006.01) |
| G06F 15/16 | (2006.01) |
| G06T 1/60 | (2006.01) |
| G06T 15/00 | (2011.01) |
| G06F 9/455 | (2006.01) |

(52) U.S. Cl.
CPC .......... *G06T 15/005* (2013.01); *G06F 9/45558* (2013.01); *G06F 2009/45579* (2013.01)
USPC ............................. 345/501; 345/502; 345/530

(58) Field of Classification Search
CPC ............ G06F 11/0712; G06F 11/0793; G06F 11/1438
USPC .......................................... 345/501, 502, 530
See application file for complete search history.

(56) References Cited

U.S. PATENT DOCUMENTS

| | | | |
|---|---|---|---|
| 5,675,762 A * | 10/1997 | Bodin et al. | 711/206 |
| 5,991,856 A * | 11/1999 | Spilo et al. | 711/147 |
| 6,240,531 B1 | 5/2001 | Spilo et al. | |
| 7,263,690 B1 * | 8/2007 | Shapiro | 717/128 |
| 7,360,022 B2 * | 4/2008 | Tian et al. | 711/123 |
| 7,594,042 B2 * | 9/2009 | Lim | 710/23 |
| 7,725,559 B2 | 5/2010 | Landis et al. | |
| 7,797,587 B2 * | 9/2010 | Vasudevan et al. | 714/47.1 |
| 8,060,683 B2 * | 11/2011 | Shultz et al. | 711/6 |
| 8,169,436 B2 * | 5/2012 | Rivera et al. | 345/419 |
| 8,341,624 B1 | 12/2012 | Hobbs | |
| 8,413,144 B1 * | 4/2013 | Manmohan et al. | 718/1 |
| 8,589,921 B2 | 11/2013 | Heim | |
| 2005/0041031 A1 | 2/2005 | Diard | |

(Continued)

FOREIGN PATENT DOCUMENTS

| | | |
|---|---|---|
| CN | 1790294 A | 6/2006 |
| TW | 200948088 | 11/2009 |

OTHER PUBLICATIONS

"Introduction to Multi-tenant Web Applications", www.pnexpert. com-Multitenants_datacenters.html, accessed Jul. 15, 2010, 6 pages.

(Continued)

*Primary Examiner* — Joni Richer
(74) *Attorney, Agent, or Firm* — Kate Drakos; Micky Minhas

(57) ABSTRACT

Exemplary techniques for recovering from a graphics processor reset are herein disclosed. In an exemplary embodiment, a 3D graphics service manager 404 can detect that a graphics processing unit reset and can restart a rendering process configured to render 3D graphics for a virtual machine and cause a graphics buffer to be established between the rendering process and the virtual machine. In addition to the foregoing, other aspects are described in the detailed description, claims, and figures.

20 Claims, 11 Drawing Sheets

(56) References Cited

U.S. PATENT DOCUMENTS

| | | | |
|---|---|---|---|
| 2006/0136667 | A1 | 6/2006 | Shultz et al. |
| 2007/0143762 | A1* | 6/2007 | Arnold et al. ................. 718/103 |
| 2008/0141264 | A1 | 6/2008 | Johnson |
| 2008/0263407 | A1 | 10/2008 | Yamamoto |
| 2008/0320489 | A1 | 12/2008 | Grouzdev |
| 2009/0119541 | A1 | 5/2009 | Inoue et al. |
| 2009/0160865 | A1 | 6/2009 | Grossman |
| 2009/0322784 | A1* | 12/2009 | Sartori .......................... 345/619 |
| 2010/0115510 | A1 | 5/2010 | Ford et al. |
| 2010/0125845 | A1 | 5/2010 | Sugumar et al. |
| 2010/0131944 | A1 | 5/2010 | Iorio et al. |
| 2010/0138528 | A1 | 6/2010 | Frank |
| 2010/0138830 | A1 | 6/2010 | Astete et al. |
| 2011/0084973 | A1 | 4/2011 | Masood |
| 2012/0149464 | A1 | 6/2012 | Bone et al. |

OTHER PUBLICATIONS

"Load Balancing Clustering", www.exforsys.com-tutorials-clustering-load-balancing-clustering.html, Exforsys Inc., accessed Jul. 15, 2010, 3 pages.

"Online Backup and Recovery of Virtual Server Environments", White Paper, Digital, Iron Mountain, Nov. 2008, 1-7.

"Oracle VM Management Pack", Oracle, Oracle Data Sheet, retrieved Jul. 15, 2010, 1-5.

"System Center Virtual Machine Manager 2007 Product Overview", www.technet.microsoft.com-en-us-systemcenter-vmm-bb871026(printer).aspx, Microsoft TechNet, accessed Jul. 15, 2010, 6 pages.

"Two Technologies Combined in One Great Solution", www.lbvm.sourceforge.net, Load Balancing of Virtual Machines (LBVM), accessed Jul. 15, 2010, 1 page.

"VMotion—Seamless OS load-balancing", www.taranfx.com-vmotion-seamless-os-load-balancing, accessed Jul. 15, 2009, 3 pages.

"VMware vCenter Site Recovery Manager", www.vmware.com-products-site-recovery-manager, Data Disaster Recovery for Servers, accessed Jul. 14, 2010, 3 pages.

Cully et al., "Remus: High Availability via Asynchronous Virtual Machine Replication", NSDI'08: Proceedings of the 5th USENIX Symposium on Networked Systems Design and Implementation, San Francisco, California, (no month available) 2008, 14 pages.

Fraser et al., "Safe Hardware Access with the Xen Virtual Machine Monitor", Proceedings of the 1st Workshop on Operating System and Architectural Support for the on demand IT InfraStructure (OASIS), (no month available) 2004, 10 pages.

Jo et al., "Transparent Fault Tolerance of Device Drivers for Virtual Machines", KAIST, depart of Computer Science. Jun. 29, 2009, 1-14.

China Application No. 201110308311.0; Office Action; dated Mar. 3, 2014; 13 pages.

China Application No. 201110308311.0; Office Action; dated Jul. 23, 2014; 15 pages.

\* cited by examiner

DYNAMIC VIRTUAL DEVICE FAILURE RECOVERY

CROSS REFERENCE TO RELATED CASES

This application is related by subject matter to U.S. patent application Ser. No. 12/895,605 entitled "Techniques for Load Balancing GPU Enabled Virtual Machines," the content of which is herein incorporated by reference in its entirety.

BACKGROUND

Virtual machine platforms enable the simultaneous execution of multiple guest operating systems on a physical machine by running each operating system within its own virtual machine. One exemplary service that can be offered in a virtual machine is a virtual desktop session. A virtual desktop session is essentially a personal computer environment run within a virtual machine that has its user interface sent to a remote computer. This architecture is similar to a remote desktop environment, however instead of having multiple users simultaneously connect to a server class operating system, in a virtual desktop session each user has access to their own commodity operating system executing in a virtual machine.

Modern operating systems render three-dimensional (3D) graphical user interfaces for 3D applications/videogames and its operating system user interface. Users enjoy the experience of interacting with a 3D environment and it would be desirable to be able to stream 3D graphics to a client in a virtual desktop session; however, enabling streaming 3D graphics is difficult for numerous reasons. For example, the act of streaming 3D graphics requires bandwidth and/or compression. Furthermore, the virtual desktop server would need to include 3D graphics processing units (GPUs), which are capable of performing 3D functions. 3D graphics processing is resource intensive and the GPUs are typically only able to render a couple 3D graphical user interface at a time. These GPUs can quickly become overloaded if they have to render too many graphical user interfaces. Unfortunately, in a virtual desktop deployment, the GPUs may have to simultaneously render a large number of 3D graphical user interfaces. This can cause one or more operations to timeout, which can cause the graphics driver to reset the GPU, which causes the 3D applications to terminate. Accordingly, techniques for recovering from a reset are desirable.

SUMMARY

An exemplary embodiment includes a system. In this example, the system includes, but is not limited to a processor and a memory in communication with the processor when the computer system is operational. In this example, the memory can include computer readable instructions that upon execution cause the processor to establishing a communication channel between a virtualization platform and the virtual machine; detecting that a rendering process configured to render graphics for the virtual machine on the 3D graphics processing unit terminated; restarting the rendering process; sending, via the communication channel, a signal indicating that the rendering process is being restarted to a virtual device driver executing in the virtual machine and establishing a graphics buffer between the virtual device driver executing in the virtual machine and the restarted rendering process. In addition to the foregoing, other techniques are described in the claims, the detailed description, and the figures.

Another exemplary embodiment includes a computer-readable storage medium. In this example, the computer-readable storage medium includes computer readable instructions that upon execution cause a processor to establishing a communication channel between a host operating system and a virtual machine; running a rendering process in the host operating system, wherein the rendering process is configured to render graphics for the virtual machine on a 3D graphics processing unit; detecting that the rendering process terminated; restarting the rendering process; sending, via the communication channel, a message indicating that the rendering process was restarted; establishing, by a virtual device driver in the virtual machine, a graphics buffer in a range of guest memory; and sending, via the communication channel, 3D graphics data to the restarted rendering process. In addition to the foregoing, other techniques are described in the claims, the detailed description, and the figures.

Another exemplary embodiment includes a method. In this example, the method includes, but is not limited to establishing, by virtualization platform, a communication channel between the virtualization platform and a virtual machine; running, by the virtualization platform, a rendering process configured to render graphics for the virtual machine on a 3D graphics processing unit; detecting, by the virtualization platform, that the rendering process terminated; restarting, by the virtualization platform, the rendering process; sending, via the communication channel, a message indicating that the rendering process was restarted to the virtual machine; establishing, by a virtual device driver executing within the virtual machine, a graphics buffer in a range of guest memory; sending, via the graphics buffer, 3D graphics data to the restarted rendering process. In addition to the foregoing, other techniques are described in the claims, the detailed description, and the figures.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
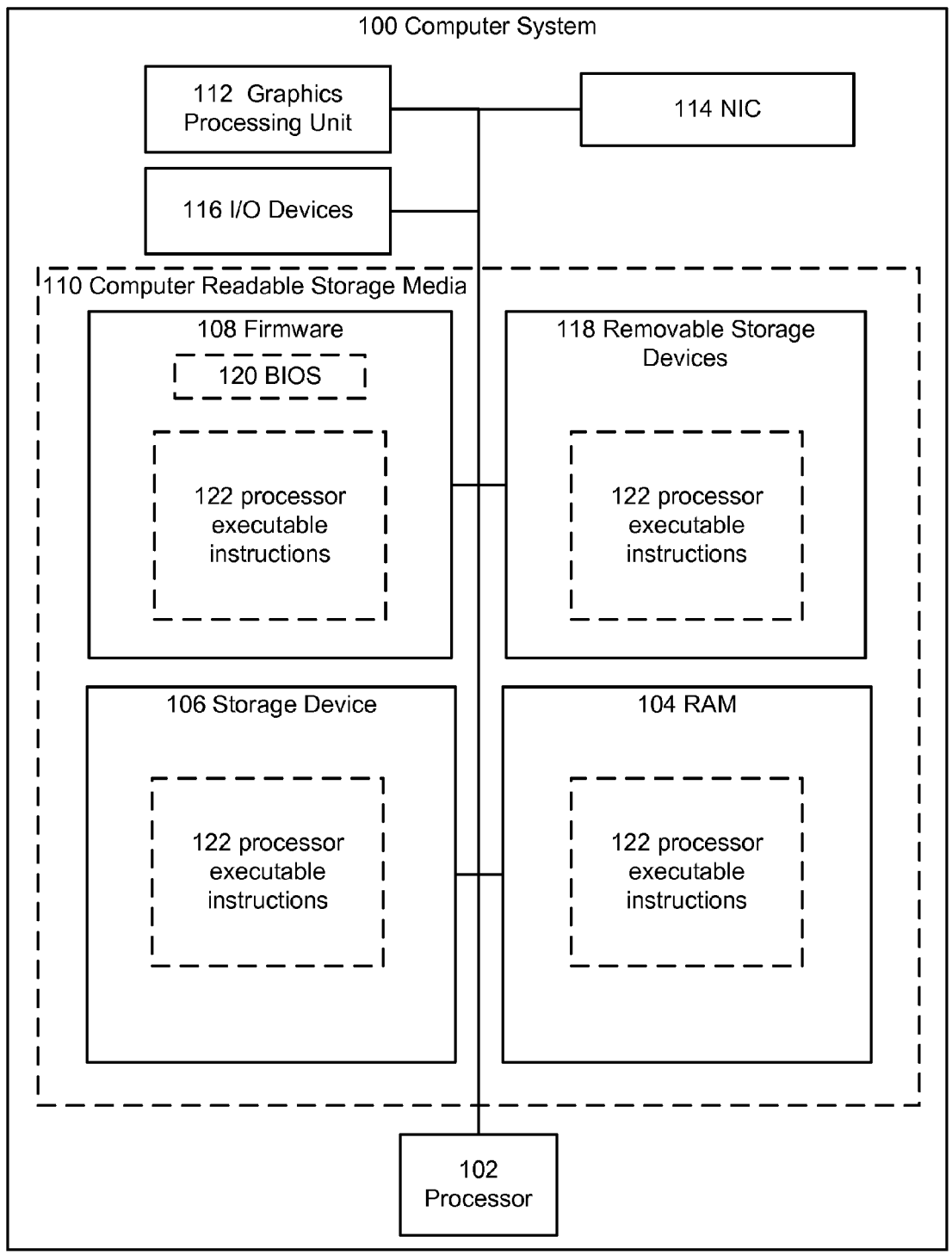
FIG. 1 depicts a high-level block diagram of a computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and volatile storage of processor executable instructions 122, data structures, program modules and other data for the computer 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
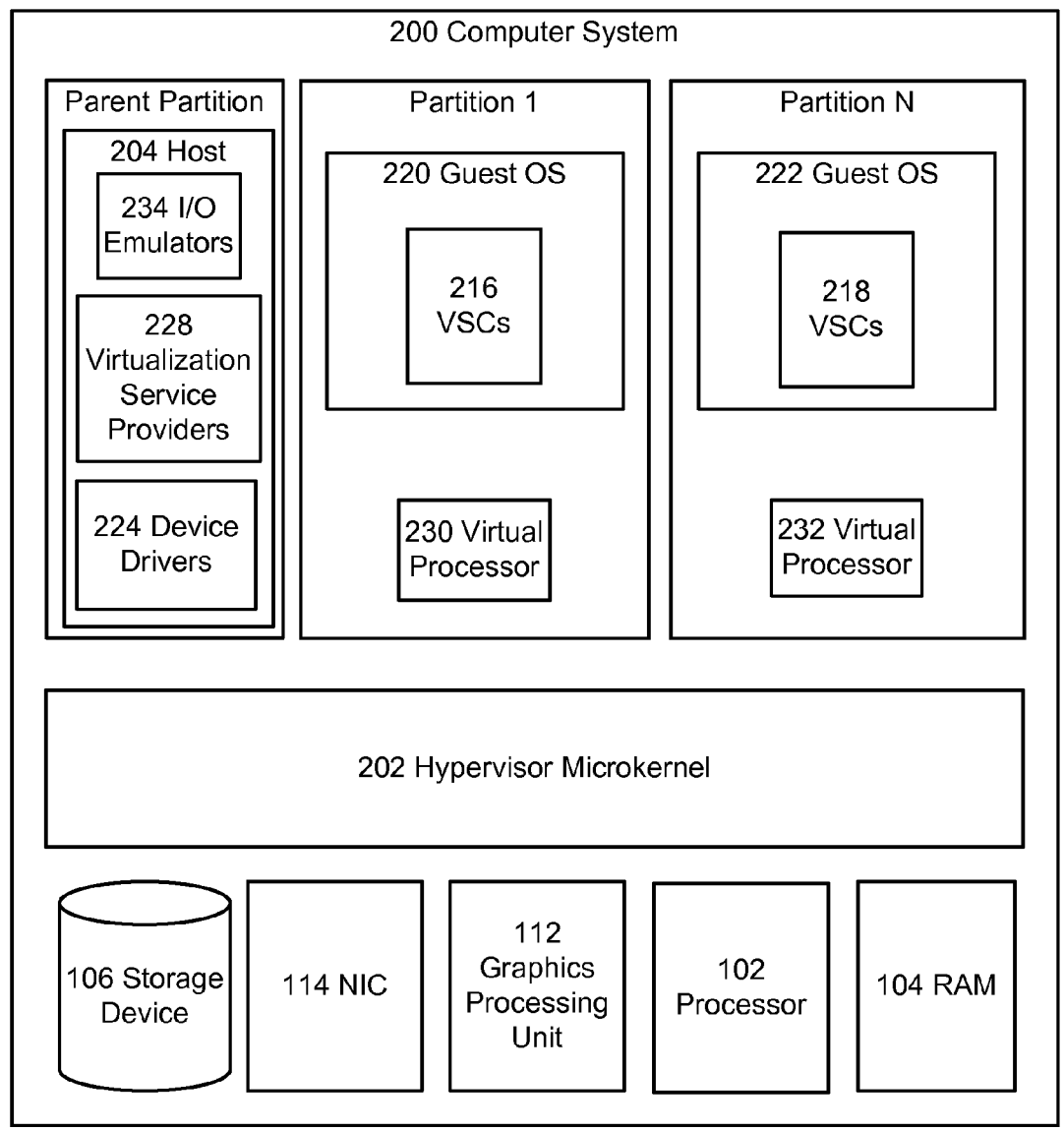
FIG. 2 depicts a high-level block diagram of a virtual machine server.

Turning to FIG. 2, illustrated is an exemplary virtualization platform that can be used to generate virtual machines. In this embodiment, hypervisor microkernel 202 can be configured to control and arbitrate access to the hardware of computer system 200. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, microkernel hypervisor 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
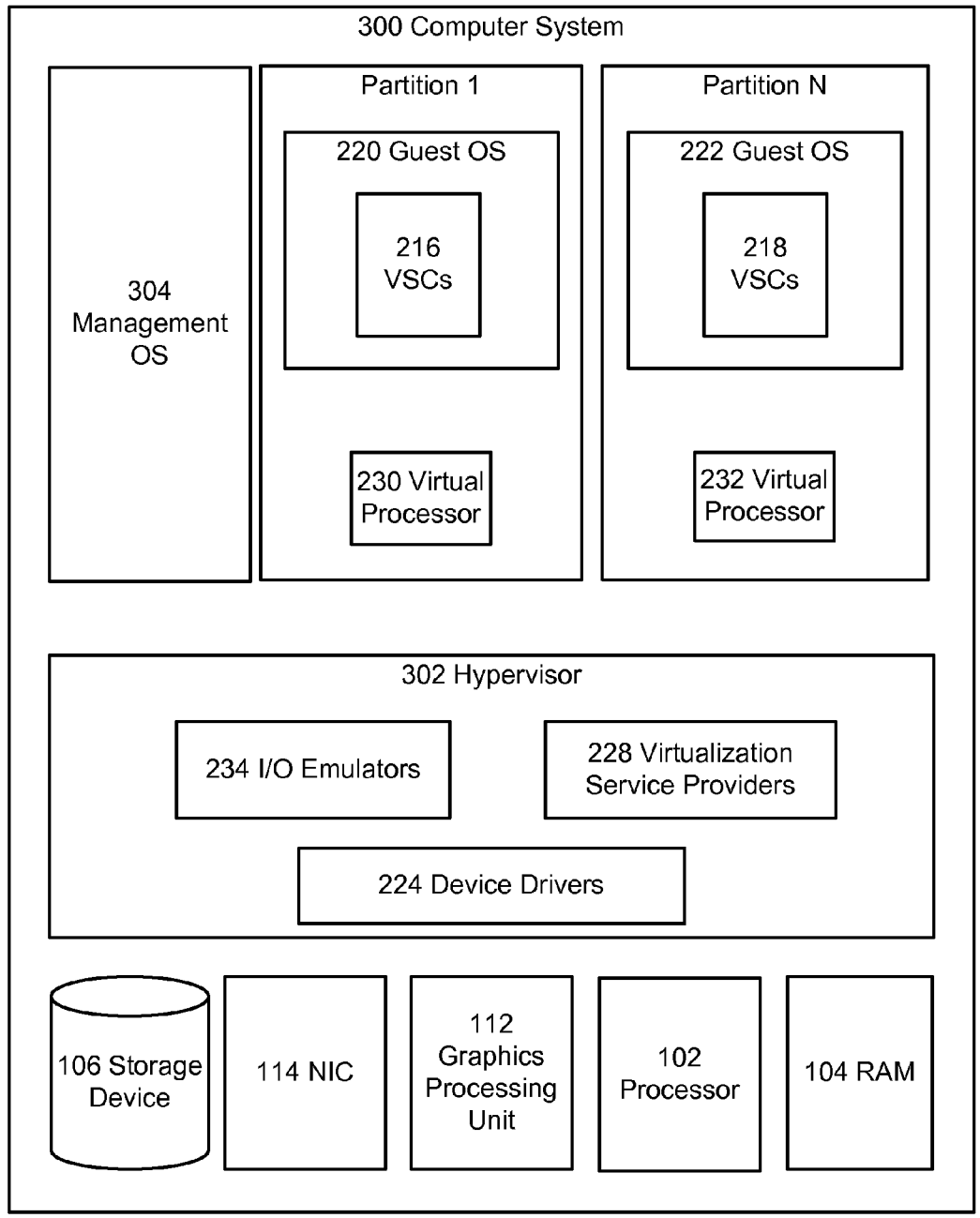
FIG. 3 depicts a high-level block diagram of a virtual machine server.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
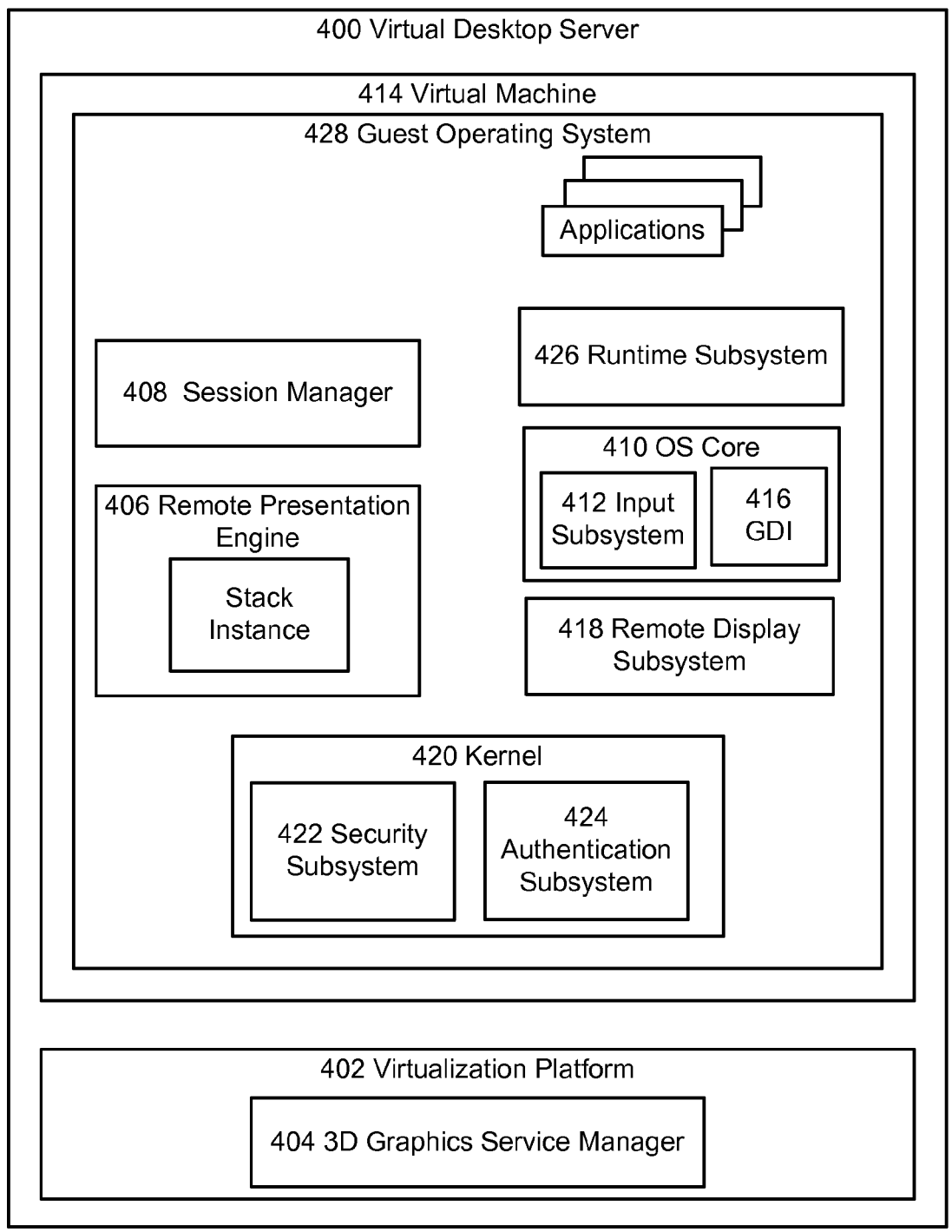
FIG. 4 depicts a high-level block diagram of a virtual desktop server

Turning now to FIG. 4, it illustrates a high-level block diagram of virtual desktop server 400. In an embodiment, virtual desktop server 400 can be configured to deploy virtual desktop sessions (VDS) to clients, e.g., mobile devices such as smart phones, computer systems having components similar to those illustrated in FIG. 1, etc. Briefly, virtual desktop technology allows a user to remotely interact with a guest operating system running in a virtual machine. Unlike a remote desktop session, in a virtual desktop session only one user is logged into a guest operating system and the user can have total control of it, e.g., the user runs as an administrator and has full rights on the guest. In the illustrated example, virtual desktop server 400 can have components similar to computer system 200 or 300 of FIG. 2 or FIG. 3. Virtualization platform 402 is a logical abstraction of virtualization infrastructure components described above in FIG. 2 and FIG. 3. The functionality described in the following sections as "within" virtualization platform 402 can be implemented in one or more of the elements depicted in FIG. 2 or FIG. 3. For example, 3D graphics service manager 404, which is described in more detail in the following paragraphs, can be implemented in a host 204 of FIG. 2. In a more specific example, 3D graphics service manager 404 can be implemented in a host operating system running in a parent partition.

Starting a virtual desktop session requires the instantiation of a guest operating system within a virtual machine. In an exemplary embodiment, a virtual desktop manager, e.g., a module of processor executable instructions, can start up virtual machine 414 (which can boot guest operating system 428) in response to a request. The virtual desktop manager can execute on a processor and instruct virtualization platform 402, e.g., microkernel hypervisor 202, to allocate memory for a partition. Virtualization platform 402 can execute and configure virtual devices within memory of virtual machine 414 and load a boot loader program into memory allocated to VM 414. The boot loader program can execute on a virtual processor (which in turn can run on a processor) and guest operating system 428 can be loaded within virtual machine 414. Session manager 408 can be loaded by guest operating system 428 and it can load environment subsystems such as runtime subsystem 426 that can include a kernel mode part such as operating system core 410. The environment subsystems in an embodiment can be configured to expose a subset of services to application programs and provide an access point to kernel 420. When guest operating system 428 is loaded, the boot loader program can exit and turn control of virtual machine 414 over to guest operating system 428. Guest operating system 428 can execute the various modules illustrated in FIG. 4 and configure itself to host a virtual desktop session. For example, guest operating system 428 can include registry values that cause remote presentation engine 406, session manager 408, etc. to start upon boot.

At some point after guest operating system 428 is running it can receive a connection request from a client. The incoming connection request can first be handled by remote presentation engine 406, which can be configured to listen for connection messages, and when one is received it can spawn a stack instance. Remote presentation engine 406 can run a protocol stack instance for the session and a 3D graphical user interface rendered by virtualization platform 402 (described in more detail in the following paragraphs) can be received by remote display subsystem 418 and sent via the protocol stack instance to a client. Generally, the protocol stack instance can be configured to route user interface output to an associated client and route user input received from the associated client to operating system core 410. Briefly, operating system core 410 can be configured to manage screen output; collect input from keyboards, mice, and other devices.

A user credential, e.g., a username/password combination, can be received by remote presentation engine 406 and passed to session manager 408. Session manager 408 can pass the credential to a logon procedure, which can route the credential to authentication subsystem 424 for verification. Authentication subsystem 424 can determine that the user credential is valid and a virtual desktop session can be started, i.e., the user can be logged into guest operating system 428.

Authentication subsystem 424 can also generate a system token, which can be used whenever a user attempts to execute a process to determine whether the user has the security credentials to run the process or thread. For example, when a process or thread attempts to gain access, e.g., open, close, delete, and/or modify an object, e.g., a file, setting, or an application, the thread or process can be authenticated by security subsystem 422. Security subsystem 422 can check the system token against an access control list associated with the object and determine whether the thread has permission based on a comparison of information in the system token and the access control list. If security subsystem 422 determines that the thread is authorized then the thread can be allowed to access the object.

Continuing with the description of FIG. 4, in an embodiment the operating system core 410 can include a graphics display interface 416 (GDI) and input subsystem 412. Input subsystem 412 in an example embodiment can be configured to receive user input from a client via the protocol stack instance for the virtual desktop session and send the input to operating system core 410. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the operating system core 410 and the input subsystem 412 can be configured to determine that an icon is located at the coordinates associated with the double-click. Input subsystem 412 can then be configured to send a notification to runtime subsystem 426 that can execute a process for the application associated with the icon.

Two-dimensional draw commands can be received from applications and/or a desktop and processed by GDI 416. GDI 416 in general can include a process that can generate graphical object draw commands. GDI 416 in this example embodiment can be configured to pass the commands to remote display subsystem 418 configured to receive 2D draw commands and send them to the client.

Figure 5:
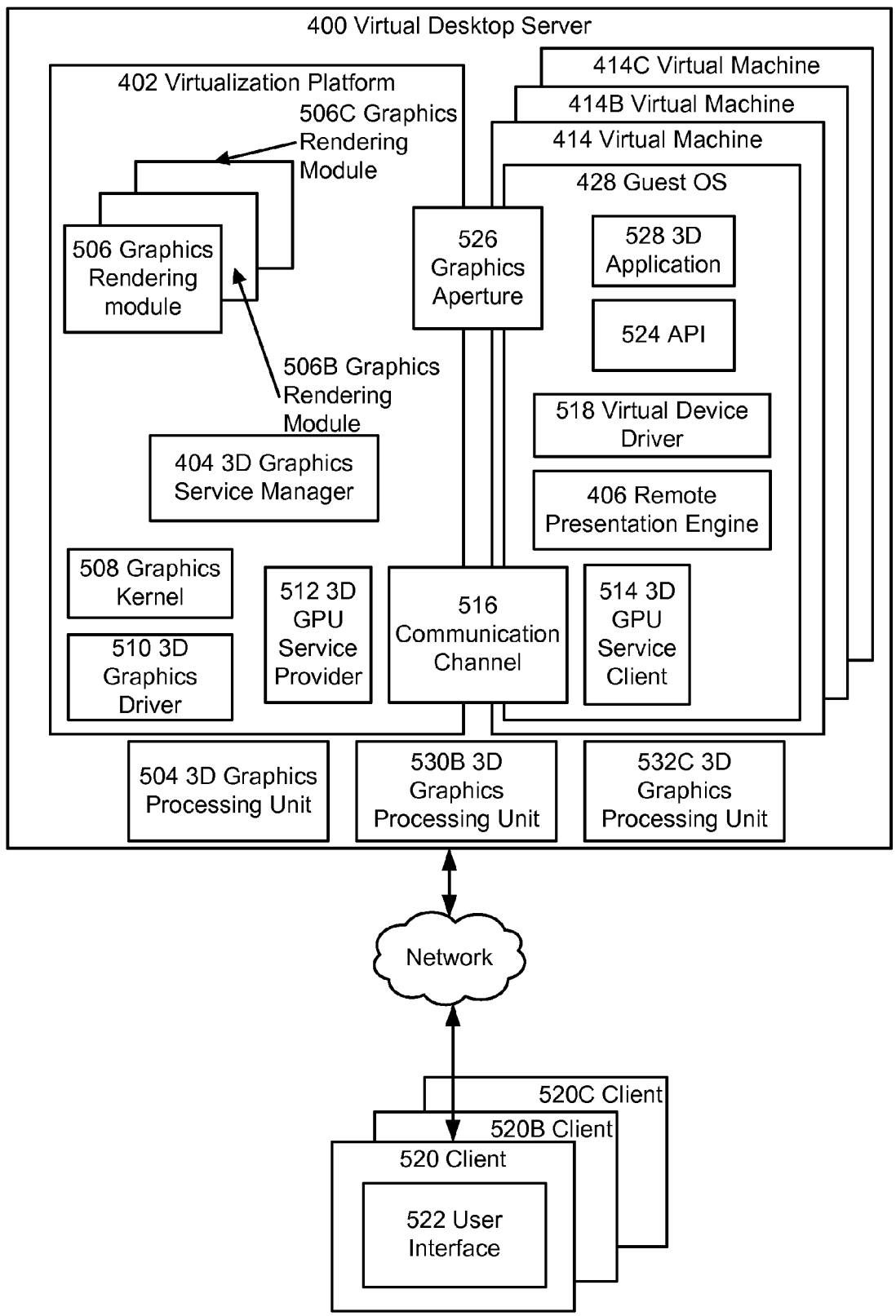
FIG. 5 depicts a high-level block diagram of a virtual desktop server

Turning to FIG. 5, it illustrates an operational environment for recovering from graphics processor resets. In this illustrated embodiment, virtual desktop server 400 can include the elements illustrated in FIG. 4 and be configured to stream images indicative of three-dimensional graphical user interfaces to clients such as client 520, 520B, and/or 520C. Briefly, each client can be associated with a virtual machine (414, 414B, and 414C) running a guest operating system configured to conduct a virtual desktop session. Clients 520, 520B, and/or 520C can include computer system having components similar to those illustrated in FIG. 1, mobile devices, and/or thin-clients. For example, the thin-client may have commodity hardware and a monolithic web-browser configured to manage the hardware, user input and output, and connect to the Internet. In this example, the thin-client may also include user interface 522, e.g., a display and user input device such as a mouse.

Virtual desktop server 400 can be configured to render 3D graphics when it is started. For example, when virtual desktop server 400 runs, an instance of a 3D graphics service manager such as 3D graphics service manager 404 can be started. 3D graphics service manager 404, which is described in more detail in the following paragraphs, can execute on a processor and wait for incoming virtual desktop session connections.

3D graphics service manager 404 can be notified when a virtual desktop session connection is received and start an instance of a graphics rendering module (described in the following paragraphs in more detail) and send a signal to 3D-GPU service provider 512 to load 3D components in guest operating system 428. Briefly, 3D graphics service manager 404 can load an instance of a graphics rendering module for each virtual machine and can pass graphics rendering module a device identifier for the 3D graphics processing unit it is going use. The graphics rendering module can then bind to the 3D GPU and render to it on behalf of its associated virtual machine. In the illustrated example, graphics rendering module 506 corresponds to virtual machine 414.

The graphical user interface for a virtual machine can be fed from the virtual machine to a rendering module, which is treated by virtualization platform 402 as a 3D process generating a graphical user interface. Since most 3D graphics processing units are designed to simultaneously generate a few graphical user interfaces for a few processes at one time, one skilled in the art can appreciate that in the instance where a large number graphics rendering modules are running the GPU could easily become overloaded and be reset.

Continuing with the initialization procedure, 3D-GPU service provider 512 can cause 3D graphics service client 514 to spawn in guest operating system 428. For example, memory addresses of a virtual motherboard in virtual machine 414 can have intercepts set on certain addresses that are mapped to IO devices. As guest operating system 428 starts, a plug-in-play module can execute and can query memory addresses mapped to IO. The hypervisor, e.g., hypervisor 202 of FIG. 2, can intercept the read and respond with a device identifier that causes plug-in-play module to load 3D graphics service client 514. 3D graphics service client 514 can setup a communication channel to 3D-GPU service provider 512 by mapping one or more pages of memory as shared and pass the map to 3D-GPU service provider 512. Within the pages of memory, communication channel 516 can be established. Essentially, communication channel 516 can include a ring buffer or the like that is mapped to virtual machine 414 and virtualization platform 402. In this example, messages can be written into the ring buffer and read out of the ring buffer by 3D GPU service provider/client. In an exemplary embodiment, communication channel can be implemented using techniques described in the commonly assigned U.S. Pat. No. 7,689,800 entitled "Partition Bus," the contents of which are herein incorporated by reference in its entirety.

3D graphics service client 514 can also cause virtual device driver 518 to spawn. Virtual device driver 518 can establish a graphics buffer, e.g., a shared library, a pipe, or graphics aperture 526 between virtual machine 414 and virtualization platform 402. In an exemplary embodiment, virtual device driver 518 can allocate a group of guest memory pages and send a signal to 3D graphics service client 514 that includes a connection request and the addresses of the memory pages. Graphics rendering module 506 can receive the connection request and the addresses of the memory pages. Graphics rendering module 506 can send a signal to the hypervisor instructing the hypervisor to create graphics aperture 526 in the group of memory pages. The hypervisor can map the pages to system physical addresses and execute graphics aperture 526 within the range of memory. In this example, virtual device driver 518 can be configured to write DMA buffers to the range of guest memory addresses. When data is written to the range of guest memory addresses, graphics aperture 526 routes the DMA buffers to the attached graphics rendering module.

In an exemplary embodiment, virtual device driver 518 can appear as a device driver for a 3D capable graphics processing unit to guest operating system 428, thereby causing guest operating system 428 to configure itself to support 3D graphics, e.g., by loading an instance of an application program interface 524 (API). Virtual device driver 518 can be configured to interface with API 524, which enables 3D application 528 to produce 3D graphics. 3D application 528, e.g., an operating system graphical user interface, user interface for an application/videogame, etc., can issue instructions to API 524, which can be an API such as DirectX from Microsoft®. Briefly, 3D graphics API 524 provides an abstraction layer between a graphics application, e.g., a videogame, and a driver (in this case virtual device driver 518). On one end, API 524 provides a low-level interface to graphics processing unit interfaces exposed by virtual device driver 518 and on the other; it provides a library of 3D graphics commands that can be called by applications. API 524 can map the library of 3D graphics commands to the interfaces exposed by virtual device driver 518 thus freeing game developers from having to understand the particularities of every graphics driver.

API 524 can generate primitives, e.g., the fundamental geometric shapes used in computer graphics as building blocks for other shapes represented as vertices and constants, and store the primitives in a plurality direct memory access (DMA) buffers. Virtual device driver 518 can send the primitives to graphics rendering module 506 via graphics aperture 526 and graphics rendering module 506 can store the buffers in memory. When API 524 issues a draw command, virtual device driver 518 can place the command and additional data in the DMA buffers; package them into one or more GPU tokens; and send the GPU tokens to graphics rendering module 506 via graphics aperture 526.

Graphics rendering module 506 can receive the tokens; extract the command from the DMA buffer and issue the command to graphics kernel 508. In an exemplary embodiment, graphics rendering module 506 can translate the commands and the primitives in the DMA buffers into API constructs that can be processed by 3D graphics driver 510.

Graphics kernel 508, which can be configured to schedule execution on the graphics processing units within virtual desktop server 400, can receive the commands and the addresses of the DMA buffers and determine when to issue the commands to 3D graphics driver 510. When the primitives from the various DMA buffers are to be rendered, graphics kernel 508 can send draw commands to 3D graphics driver 510, which can execute on a processor and can direct graphics processing unit 504 to execute the commands and process the data in the DMA buffers.

Graphics processing unit 504 can execute and generate a bitmap, e.g., an array of pixel values, indicative of an image frame in memory. Graphics rendering module 506 can capture the bitmap and pass the bitmap to a compression module and then to remote presentation engine 406 via graphics aperture 526. Remote presentation engine 406 can send the bitmap to client 520 via one or more packets of information.

In an exemplary embodiment, 3D graphics service manager 404 can configure virtual desktop server 400 to recover when graphics processing units (504, 504B, and/or 504C) reset (while three 3D graphics processing units are illustrated, in an example embodiment virtual desktop server 400 can include a fewer number of graphics 3D GPUs or many more 3D GPUs). Briefly, 3D graphics service manager 404 can be configured to select a 3D GPU to render graphics for a virtual machine and cause the associating graphics rendering module to bind, e.g., connect, to the graphics processing unit. Moreover, in exemplary embodiments 3D graphics service manager 404 can be configured to monitor the performance of the virtual machines and graphics processing units and recover in the event that a graphics processing unit resets.

In some instances, the stream of data sent by one or a plurality of graphics rendering modules can cause the graphics processing unit to be reset. This causes the 3D graphics driver 510 to reset, which in turn causes the graphics kernel 508 to reset connections to this GPU, which causes any graphics rendering modules bound to the GPU to terminate. At this point, 3D graphics service manager 404 can be configured to recover from the unexpected termination to minimize the impact on the virtual desktop session.

In an exemplary embodiment, 3D graphics service manager 404 can receive a signal from virtualization platform 402 that indicates that a graphics rendering module unexpectedly quit, i.e., graphics rendering module 506 terminated. In this example, 3D graphics service manager 404 can be configured to determine what virtual machine graphics rendering module 506 was associated with, i.e., virtual machine 414; determine whether or not to restart graphics rendering module 506; and execute a recovery operation.

In an exemplary embodiment, 3D graphics service manager 404 can include a table that includes an identifier for each graphics rendering module within the system and information that identifies which virtual machine each graphics rendering module is associated with. This information could be populated with each virtual machine starts. For example, when a virtual machine such as virtual machine 414 starts, 3D graphics service manager 404 can spawn an instance of a graphics rendering module such as graphics rendering module 506 and store information that links graphics rendering module 506 to virtual machine 414 in the table. In a specific example, if graphics rendering module 506 is reset, 3D graphics service manager 404 can check the table and determine that 3D graphics service manager 404 is configured to render graphics for virtual machine 414.

In an exemplary embodiment, 3D graphics service manager 404 can be configured to determine whether or not to restart the graphics rendering module based on information that it has in the table. For example, 3D graphics service manager 404 can be configured to check the throughput associated with the virtual machine to attempt to determine if the throughput is indicative of a denial-of-service attack. A denial-of-service attack is an attempt to make the 3D graphics processing unit unavailable for any other virtual machine bound to it by flooding the 3D graphics processing unit with commands. 3D graphics service manager 404 can compare the throughput pattern for the virtual machine and compare it to a pattern of normal throughput. In the instance that the throughput pattern does not match a pattern associated with a denial-of-service attack, 3D graphics service manager 404 can be configured to restart the graphics rendering module for the virtual machine.

In the same, or another example embodiment, 3D graphics service manager 404 can be configured to determine whether the graphics processing unit was overloaded before restarting the graphics rendering module for the virtual machine. In the instance that the graphics processing unit was overloaded, i.e., is servicing too many virtual machines, 3D graphics service manager 404 can be configured to end the virtual desktop session, restart the graphics rendering module on the GPU, or restart the graphics rendering module and bind it to a different graphics processing unit.

In an example embodiment, 3D graphics service manager 404 can check the estimated amount of graphics memory that is controlled by the GPU to determine if the GPU is overloaded. For example, each 3D graphics processing unit can be integrated within a graphics adapter and be attached to a cache of graphics memory that it can control. Briefly, graphics memory can be used to store the bitmap of the screen image, a Z-buffer (which manages the depth coordinates in 3D graphics), textures, vertex buffers, and compiled shader programs. In exemplary embodiments, graphics RAM can be high-speed or multi-port memory, such as video RAM, dynamic random access memory, or random access memory based on double data rate (DDR) technology such as DDR2, and graphics DDR (GDDR3, GDDR4, and/or GDDR5).

In an exemplary embodiment, 3D graphics service manager 404 can be configured to estimate the amount of graphics memory each virtual machine will attempt to use or the memory needed to at least adequately render an image and subtract the estimated amount from the graphics memory available to the graphics processing unit and store the estimated amount of available graphics memory in a table. In a specific example, suppose a graphics processing unit is attached to a cache of 4 gigabytes, 3D graphics service manager 404 estimates that a virtual machine would easily use 1 gigabyte of memory, and no other virtual machines are bound to the graphics processing unit. In this example, 3D graphics service manager 404 can subtract the estimated amount (1 gigabyte) from the total available amount (4 gigabytes) and store the estimated available graphics memory (3 gigabytes) in the table.

In an exemplary embodiment 3D graphics service manager 404 can estimate the amount of graphics memory that a virtual machine will require based on information that includes, but is not limited to, the pixel dimensions, the color dept, the number of displays for the virtual machine, throughput, compression ratios, the estimated amount of surfaces that will be rendered for the virtual machine, the amount of memory needed to store the primitives needed to generate vertices, the memory needed to store textures to apply to the vertices, the memory needed to apply a selected anti-aliasing effect to objects, etc. In exemplary embodiments, the estimate can be static or adaptive. For example, the amount of graphics memory a virtual machine uses over runtime can be stored and used to predict the amount the virtual machine will use during subsequent virtual desktop sessions.

In another exemplary embodiment, information that describes the average length of time that it takes the graphics processing unit to respond to commands, i.e., the latency, can be used to determine whether the graphics processing unit is stressed. For example, in an embodiment 3D graphics service manager 404 can store the average latency in a table and upon termination 3D graphics service manager 404 can compare the average latency of commands to a threshold and if the average latency is less than the threshold, then 3D graphics service manager 404 can restart the graphics rendering module, otherwise 3D graphics service manager 404 can shut the virtual machine down or attempt to restart the graphics rendering module on a different GPU using techniques similar to those described in U.S. patent application Ser. No. 12/895,605 entitled "Techniques for Load Balancing GPU Enabled Virtual Machines."

The threshold can be set by an administrator or the like and can depend on the graphics processing units used. In an exemplary embodiment, experiments can be performed that load different types of GPUs with an increasing number of virtual machines. As more virtual machines are added, the latency can be recorded and the probability of a reset can be calculated by comparing the amount of rests over a time period to the amount of resets over the same time period when the latency is lower. The monitored latency associated with a high probability of reset used to set the threshold. In an example embodiment, the monitored latency can be set as the threshold. In other exemplary embodiments, the monitored latency can be multiplied by a scalar value and the scaled latency can be used. For example, 80% of the monitored latency could be set as the threshold.

In an exemplary embodiment, the latency can be measured from the time that graphics kernel 508 issues a command to the GPU until an acknowledgment ("ACK") is received. After each ACK is received, graphics kernel 508 can send the latency associated with the request to 3D graphics service manager 404. 3D graphics service manager 404 can update a value in the table that reflects the average latency for the GPU.

In another example embodiment, the latency can be measured from the time that virtual device driver 518 starts a direct memory access transaction until an ACK is received. For example, API 524 can issue a command such as draw commands and virtual device driver 518 can start the timer when the command is received. Virtual device driver 518 can send the command to graphics rendering module 506, which in turn can send the command to graphics kernel 508. Graphics kernel 508 can send the command to 3D graphics driver 510, which can cause 3D graphics processing unit 504 to perform an operation such as a render operation that processes the primitives stored in a vertex buffer and renders a bitmap. 3D GPU 504 can generate an ACK when it receives the command and the ACK can be propagated back to virtual device driver 518. When virtual device driver 518 receives the ACK it can stop the timer. Virtual device driver 518 can then send the latency to 3D graphics service manager 404 via message-passing communication channel 516. 3D graphics service manager 404 can update a value in the table that reflects he average latency for the virtual machine.

In an exemplary embodiment, 3D graphics service manager 404 can be configured to restart graphics rendering modules after a termination is detected. In this example, 3D graphics service manager 404 can restart an instance of graphics rendering module, e.g., graphics rendering module 506, and use message passing communication channel 516 to send a signal to virtual device driver 518. Virtual device driver 518 can be configured to generate a new instance of graphics aperture 526 by allocating a new range of guest memory for graphics aperture 526 and sending the memory range along with a connection request to the restarted graphics rendering module, e.g., a new instance of graphics rendering module 506. Graphics rendering module 506 can accept the connection request and pass the range of addresses to the hypervisor. Hypervisor can remap the allocated range of memory addresses to virtualization platform 402 and load a new instance of graphics aperture 526 therein.

Upon receipt of the signal indicating that graphics rendering module 506 terminated, virtual device driver 518 can stop sending the contents in the DMA buffers, e.g., commands and primitives, shader variables, etc., to graphics aperture 526. After graphics rendering module 506 is restarted, virtual device driver 518 can resend at least a portion of data that was previously sent to graphics rendering module 506. In an exemplary embodiment, virtual device driver 518 can store all of the 3D graphics data until an image is sent to the client. For example, virtual device driver 518 can resend all the primitives in the queued DMA buffers. In the worst case scenario, a seconds worth of frames may be lost, e.g., 60 frames. In this case the user may simply see a paused screen for a second.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 6:
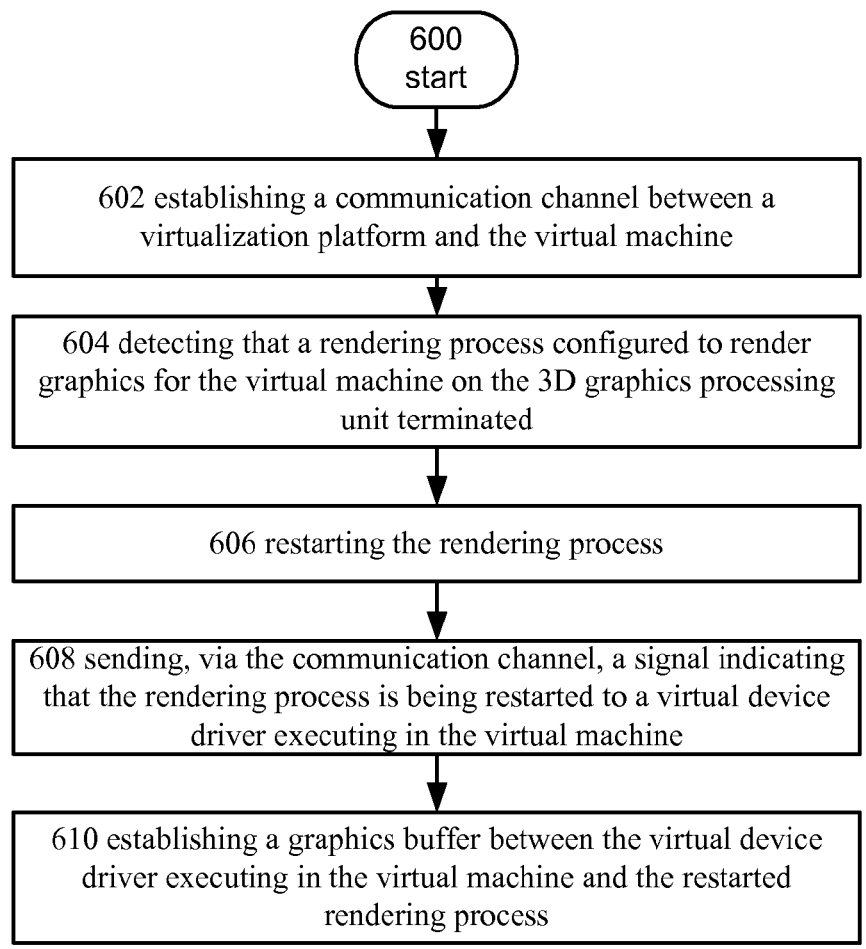
FIG. 6 depicts an operational procedure.

FIG. 6 illustrates and operational procedure for recovering from a 3D graphics processing unit reset including the operations 600, 602, 604, 606, 608, and 610. Operation 600 begins the operational procedure and operation 602 shows establishing a communication channel between a virtualization platform and the virtual machine. For example, and turning to FIG. 5, in an exemplary embodiment a component of virtualization platform 402, e.g. hypervisor 302 of FIG. 3, can include 3D GPU service provider 512, e.g., a module of executable instructions, that upon execution by a processor can cause a device identifier to appear in memory mapped to IO devices in virtual machine 414. A plug-and-play module can detect the device identifier and load 3D GPU service client 514 in memory. 3D GPU service client 514 can execute on a virtual processor and allocate a group of pages of guest memory to be used as a communication channel 516. 3D GPU service client 514 can configure communication channel 516 within the guest memory and use it to send a signal to 3D GPU service provider 512, which 3D GPU service provider 512 can accept. Messages can now pass through communication channel 516 between virtualization platform 402 and virtual machine 414.

Continuing with the description of FIG. 6, operation 604 shows detecting that a rendering process configured to render graphics for the virtual machine on the 3D graphics processing unit terminated. For example, and turning back to FIG. 5. In an exemplary embodiment 3D graphics service manager 404 can receive a signal indicating that graphics rendering module 506 unexpectedly quit. For example, virtualization platform 402 can be configured to start and monitor the execution of programs. In the instance that a program such as graphics rendering module 506 quits, virtualization platform 402 can generate an event that can be detected by 3D graphics service manger 404.

Referring to operation 606 of FIG. 6, it shows restarting the rendering process. For example, 3D graphics service manager 404 can send a signal to virtualization platform 402 directing it to allocate resources to start an instance of graphics rendering module, i.e., graphics rendering module 506, for virtual machine 414. In this example, graphics rendering module 506 can be loaded into memory and 3D graphics service manager 404 can pass it configuration information such as the identity of the graphics processing unit to use and a configuration file for virtual machine 414. Graphics rendering module 506 can bind to the identified graphics processing unit and wait for a connection request from virtual machine 414.

Turning to operation 608 of FIG. 6, it shows sending, via the communication channel, a signal indicating that the rendering process is being restarted to a virtual device driver executing in the virtual machine. Referring to FIG. 5, 3D graphics service manager 404 can execute on a processor and can cause a message to be sent to virtual machine 414 that indicates that a reset occurred. For example, 3D graphics service manager 404 can send a signal to 3D GPU service provider 512 and 3D GPU service provider 512 can write a message indicating that a reset occurred to communication channel 516. 3D GPU service client 514 can receive the message via communication channel 516 and route the message to, for example, remote presentation engine 406, which can send the message to virtual device driver 518. In this specific embodiment, remote presentation engine 406 may have a communication channel to both 3D GPU service client 514 and virtual device driver 518 and so it can be opportunistically used to route messages between the two components. In another exemplary embodiment, 3D GPU service client 514 can send the signal directly to virtual device driver 518.

Referring to FIG. 6 again, operation 610 shows establishing a graphics buffer between the virtual device driver executing in the virtual machine and the restarted rendering process. For example and turning to FIG. 5, virtual device driver 518 can receive a signal indicating that graphics rendering module 506 was restarted and can tear down the graphics buffer that it had been using to transfer 3D data, e.g., vertices, textures, etc., to virtualization platform 402 and create a new graphics buffer. For example, the graphics buffer can be implemented as graphics aperture 526. In this example, virtual device driver 518 can allocate a range of guest memory addresses and pass the range to 3D GPU service client 514, which can send the range in a message to 3D GPU service provider 512. Graphics rendering module 506 can receive the range of memory addresses and send a signal to the hypervisor. The hypervisor can receive the signal and remap the range of guest memory addresses to system memory, i.e., memory allocated to virtualization platform 402, and start a process within the graphics buffer that passes DMA buffers of 3D data from virtual device driver 518 to graphics rendering module 506. Graphics rendering module 506 can begin to receive 3D data and commands and send them to graphics kernel 508. Graphics kernel 508 can schedule their execution on a 3D graphics processing unit such as 3D GPU 504 and 3D GPU 504 can render images.

Figure 7:
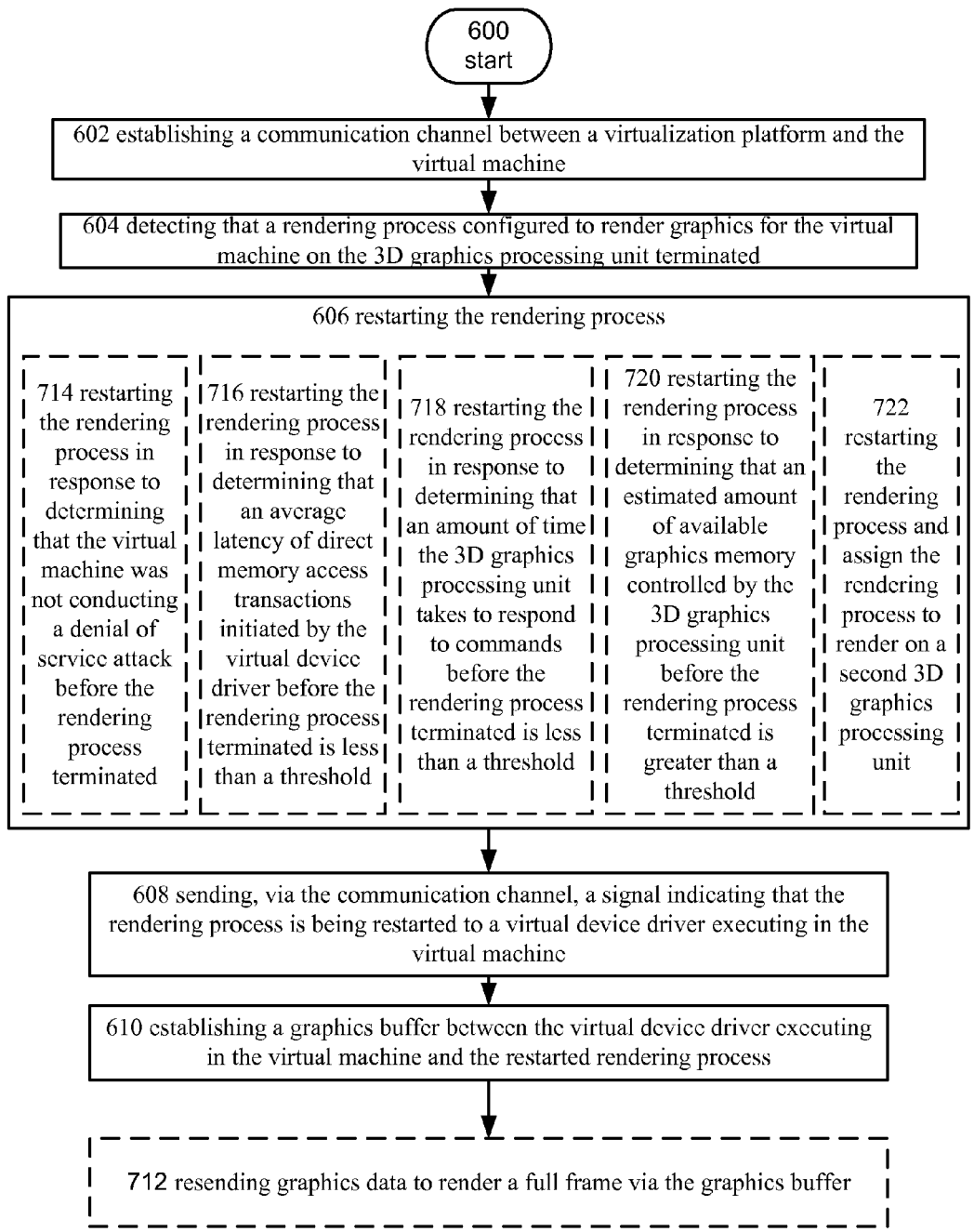
FIG. 7 illustrates the operational procedure of FIG. 6 including additional operations.

Turning now to FIG. 7, it illustrates the operational procedure of FIG. 6 including the additional operations/refinements 712-722. Operation 712 shows resending graphics data to render a full frame via the graphics buffer. For example, and referring to FIG. 6, after the graphics buffer, e.g., graphics aperture 526, is established, virtual device driver 518 can be configured to resend at least one full frame of graphics data. For example, virtual device driver 518 can keep track of what graphics data has been sent to graphics rendering module 506 and keep a copy of the vertex data until the rendered image is successfully sent to client 520. In this example, virtual device driver 518 can determine the identity of the last frame that was rendered and resend the graphics data needed to generate the next full frame. For example, since some 3D graphics data is used for multiple frames, some data that may be used for the next frame may have already been sent to graphics rendering module 506. In this example, all the data used to create the next frame can be sent via the graphics buffer to ensure that graphics rendering module 506 can render the next frame.

Referring to operation 714, it shows restarting the rendering process in response to determining that the virtual machine was not conducting a denial of service attack before the rendering process terminated. For example, in an exemplary embodiment 3D graphics service manager 404 can be configured to determine whether graphics rendering module 506 terminated because of a denial of service attack by comparing the throughput through graphics aperture 526 to a throughput pattern that represents a typical denial of service attack. In the instant that the patterns do not match, 3D graphics service manager 404 can be configured to restart graphics rendering module 506. Otherwise, 3D graphics service manager 404 can take one or more of a plurality of actions such as restart 3D graphics service manager 404, disconnect client 520, send a signal to a process configured to notify an administrator of suspicious activity, etc.

Continuing with the description of FIG. 7, operation 716 shows restarting the rendering process in response to determining that an average latency of direct memory access transactions initiated by the virtual device driver before the rendering process terminated is less than a threshold. For example, in an exemplary embodiment 3D graphics service manager 404 can be configured to determine whether 3D GPU 504 was overloaded before restarting graphics rendering module 506. In this specific example embodiment, prior to restarting graphics rendering module 506, 3D graphics service manager 404 can be configured to determine if any of the virtual machines that were rendering to GPU 504 were responsible for causing 3D graphics processing unit 504 to reset by comparing the average latency of direct memory access transactions initiated by the virtual machine to a threshold value. The latency of DMA transactions initiated by virtual machine 414 can be measured from the point in time where virtual device driver 518 receives a DMA buffer including a command for 3D GPU 504 to the point in time where an ACK signal for the command is received by virtual device driver 518.

In the instance that the average latency is greater than the threshold, 3D graphics service manager 404 can take one of a plurality of actions. For example, 3D graphics service manager 404 could restart graphics rendering module 506 and send a signal to a user of client 520 or an administrator that describes that the virtual machine 414 recovered. In this example, a warning message could be displayed on user interface 522 of client 520. In another example, 3D graphics service manager 404 could disconnect the virtual machine 414 and cause a message to be displayed on the client 520 that indicates that the client was disconnected because it caused the 3D graphics processing unit to restart. In yet another embodiment, 3D graphics service manager 404 could disconnect virtual machine 414 and send a signal to an admin. In yet another embodiment, 3D graphics service manager 404 can attempt to move at least one virtual machine to another graphics processing unit.

Turning to operation 718, it shows restarting the rendering process in response to determining that an amount of time the 3D graphics processing unit takes to respond to commands before the rendering process terminated is less than a threshold. For example, in an exemplary embodiment 3D graphics service manager 404 can be configured to determine whether 3D GPU 504 was overloaded before restarting graphics rendering module 506 by comparing the average latency associated with 3D GPU ACKs. For example, graphics kernel 508 can be configured to start a timer each time it sends a hardware command to 3D graphics processing unit 504 and stop the timer when an ACK is received. The calculated time can then be sent to 3D graphics service manager 404, which can calculate the average time the 3D graphics processing unit takes to respond. After graphics rendering module 506 terminates, 3D graphics service manager 404 can compare the average latency for hardware commands right before the termination to a threshold to determine whether the hardware was overcommitted.

In the instance that the average latency is greater than the threshold, 3D graphics service manager 404 can take one of a plurality of actions. For example, 3D graphics service manager 404 could restart graphics rendering module 506 and send a signal to a user of client 520 or an administrator that describes that the virtual machine 414 recovered. In this example, a warning message could be displayed on user interface 522 of client 520. In another example, 3D graphics service manager 404 could disconnect the virtual machine 414 and cause a message to be displayed on the client 520 that indicates that the client was disconnected because the 3D graphics processing unit had to restart. In yet another embodiment, 3D graphics service manager 404 could disconnect virtual machine 414 and send a signal to an admin. In yet another embodiment, 3D graphics service manager 404 can attempt to move at least one virtual machine to another graphics processing unit.

Referring to operation 720, it shows restarting the rendering process in response to determining that an estimated amount of available graphics memory controlled by the 3D graphics processing unit before the rendering process terminated is greater than a threshold. For example, in an exemplary embodiment 3D graphics service manager 404 can be configured to determine whether 3D GPU 504 was overloaded before restarting graphics rendering module 506 by comparing the estimated amount of graphics memory available to the graphics processing unit to a threshold amount. 3D graphics service manager 404 can be configured to estimate how much graphics memory a virtual machine such as virtual machine 414 will attempt to use when it is started and store the value in a table. 3D graphics service manager 404 can then direct a graphics rendering module, e.g., graphics rendering module 506, to bind to 3D GPU 504 and subtract the estimated amount of graphics memory for virtual machine 414 from a value that reflects an estimate of the amount of available graphics memory. Prior to restarting graphics rendering module 506, 3D graphics service manager 404 can be configured to compare the estimated amount of available graphics memory to a threshold and if the estimated value is greater than the threshold then 3D graphics service manager 404 can restart graphics rendering module 506. In an exemplary embodiment, the threshold could be set to zero. That is, as long as the estimated load on 3D GPU 504 was not greater than the total amount of graphics memory controlled by 3D GPU 504 than 3D graphics service manager 404 can restart graphics rendering module 506. In another exemplary embodiment, the threshold can be set to be a percentage of the total graphics memory, e.g., 75%. In this example, as long as the estimated load was not greater than 75% of the total amount of graphics memory controlled by 3D GPU 504 than 3D graphics service manager 404 can restart graphics rendering module 506.

Referring to operation 722, it shows restarting the rendering process and assigning the rendering process to render on a second 3D graphics processing unit. For example, and referring to FIG. 5, in this embodiment 3D graphics service manager 404 can be configured to pass an identifier for a different GPU than the one that graphics rendering process 506 was rendering to cause the restarted graphics rendering process 506 to bind to a different GPU such as 3D GPU 504B. In this example, 3D graphics service manager 404 can be configured to move one or more virtual machines that were bound to the graphics processing unit that reset and caused the associated graphics rendering modules to terminate to reduce the load on the GPU. For example, if virtual machines 414, 414B, and 414C were connected to 3D GPU 504 when it reset, 3D graphics service manager 404 can be configured to select one or more from the group and send the selected virtual machine(s) the device identifier for 3D GPU 504B and/or 3D GPU 504C. In this example, 3D graphics service manager 404 can use information such as the estimated amount of graphics memory used by each virtual machine and/or the average latency of direct memory access transactions to select which virtual machine to move.

Figure 8:
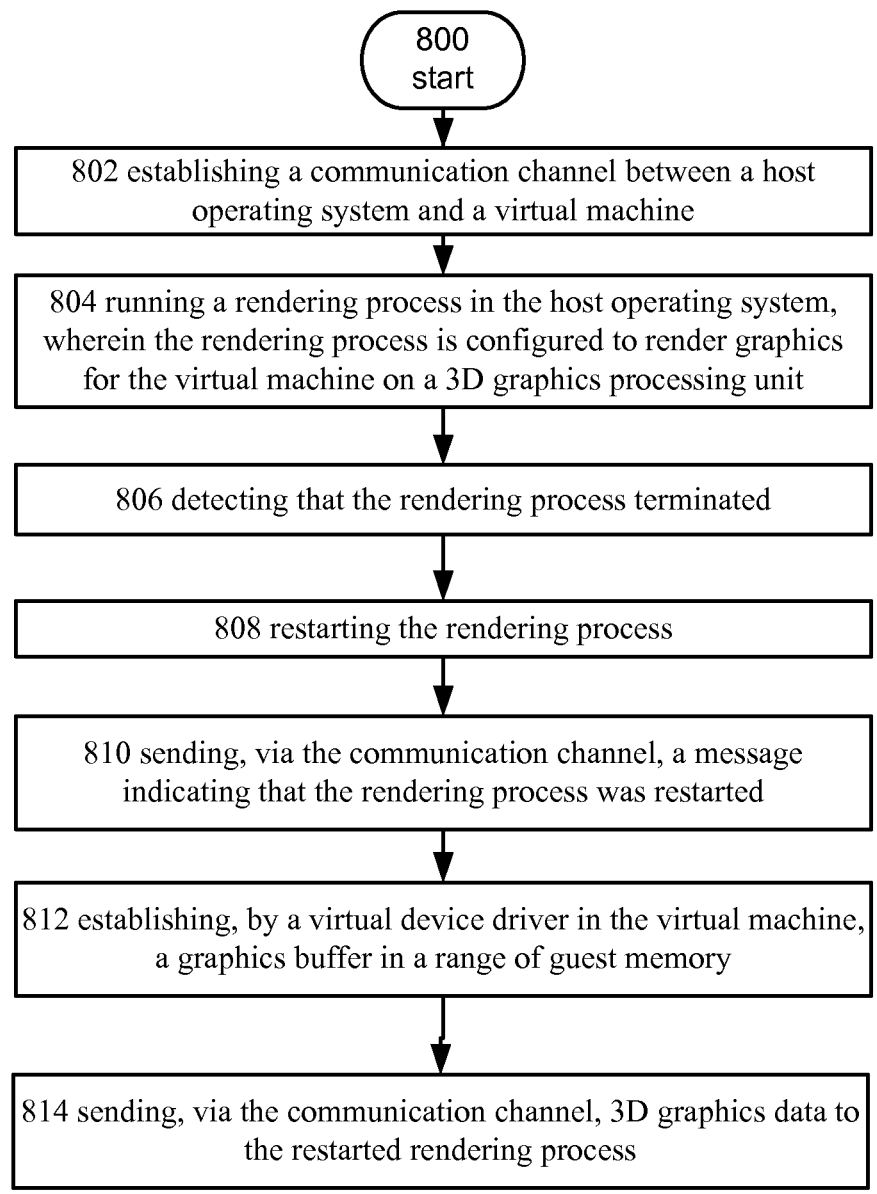
FIG. 8 depicts an operational procedure.

Turning now to FIG. 8, it illustrates an operational procedure for recovering from a graphics processing unit reset including operations 800-816. Similar to the aforementioned operational procedure, operation 800 can begin the procedure and operation 802 shows establishing a communication channel between a host operating system and a virtual machine. For example, and turning to FIG. 5, in an exemplary embodiment 3D GPU service provider 512 can execute within, for example, kernel space of a host operating system running within a parent partition of FIG. 2. In this example, 3D GPU service provider 512 can be executed by a processor and cause a device identifier to appear in memory mapped to IO devices in virtual machine 414. A plug-and-play module can detect the device identifier and load 3D GPU service client 514 in memory. 3D GPU service client 514 can execute on a virtual processor and allocate a group of pages of guest memory and setup communication channel 516 within the memory. 3D GPU service client 514 can send a connection request via communication channel 516 to 3D GPU service provider 512, which 3D GPU service provider 512 can accept. Messages can now pass through communication channel 516 between virtualization platform 402 and virtual machine 414.

Continuing with the description of FIG. 8, operation 804 shows running a rendering process in the host operating system, wherein the rendering process is configured to render graphics for the virtual machine on a 3D graphics processing unit. For example, a connection request can be received by virtualization platform 400 to start virtual machine 414. In this example, a signal can be sent to 3D graphics service manager 404, which can also be a module of executable instructions that runs within kernel mode of the host operating system, to start a graphics rendering process, e.g., a graphics rendering module, in the user space of the host operating system. 3D graphics service manager 404 can cause the host operating system to load graphics rendering module 506 and associate it with virtual machine 414.

Continuing with the description of FIG. 8, operation 806 shows detecting that the rendering process terminated. For example, and turning back to FIG. 5. In an exemplary embodiment 3D graphics service manager 404 can receive a signal from the host operating system indicating that graphics rendering module 506 unexpectedly quit. For example, the host operating system in this example can be configured to start and monitor the execution of programs. In the instance that graphics rendering module 506 unexpectedly quits, the host operating system can generate an event that can be detected by 3D graphics service manger 404.

Turning to operation 808, it shows restarting the rendering process. For example, 3D graphics service manager 404 can send a signal to the host operating system directing it to allocate resources to start an instance of graphics rendering module, i.e., graphics rendering module 506, for virtual machine 414. In this example, graphics rendering module 506 can be loaded into memory and 3D graphics service manager 404 can pass it configuration information such as the identity of the graphics processing unit to use. Graphics rendering module 506 can bind to the identified graphics processing unit, e.g., 3D GPU 504, and wait for a connection request from virtual machine 414.

Referring to operation 810 it shows sending, via the communication channel, a message indicating that the rendering process was restarted. Referring to FIG. 5, 3D graphics service manager 404 can execute on a processor and can cause a message to be sent to virtual machine 414 that indicates that a reset occurred. For example, 3D graphics service manager 404 can send a signal to 3D GPU service provider 512 and 3D GPU service provider 512 can write a message indicating that graphics rendering module 506 is restarting. 3D GPU service client 514 can receive the message via communication channel 516 and route the message to, for example, virtual device driver 518.

Turning to operation 812, it shows establishing, by a virtual device driver in the virtual machine, a graphics buffer in a range of guest memory. For example and turning to FIG. 5, in an exemplary embodiment virtual device driver 518 can receive a signal indicating that graphics rendering module 506 was restarted and can tear down the graphics buffer that it had been using to send transfer 3D data, e.g., vertices, textures, etc., from virtual machine 414 to the host operating system and create a new graphics buffer. For example, the graphics buffer can be implemented as a graphics aperture 526. In this example, virtual device driver 518 can allocate a range of guest memory addresses and pass the range to 3D GPU service client 514, which can send the range in a message to 3D GPU service provider 512. Graphics rendering module 506 can receive the range of memory addresses and send a signal to the hypervisor. Monolithic hypervisor 202 can receive the signal and remap the range of guest memory addresses to system memory, i.e., memory allocated to virtualization platform 402, and start a process within the graphics buffer that passes DMA buffers of 3D data from virtual device driver 518 to graphics rendering module 506.

Operation 814 shows sending, via the communication channel, 3D graphics data to the restarted rendering process. Virtual device driver 518 can send DMA buffers filled with vertices, textures, commands, etc., to graphics rendering module 506 via the graphics buffer, e.g., graphics aperture 526. Graphics rendering module 506 can receive the DMA buffers and send them to graphics kernel 508. Graphics kernel 508 can schedule their execution on a 3D graphics processing unit such as 3D GPU 504 and 3D GPU 504 can render images.

Figure 9:
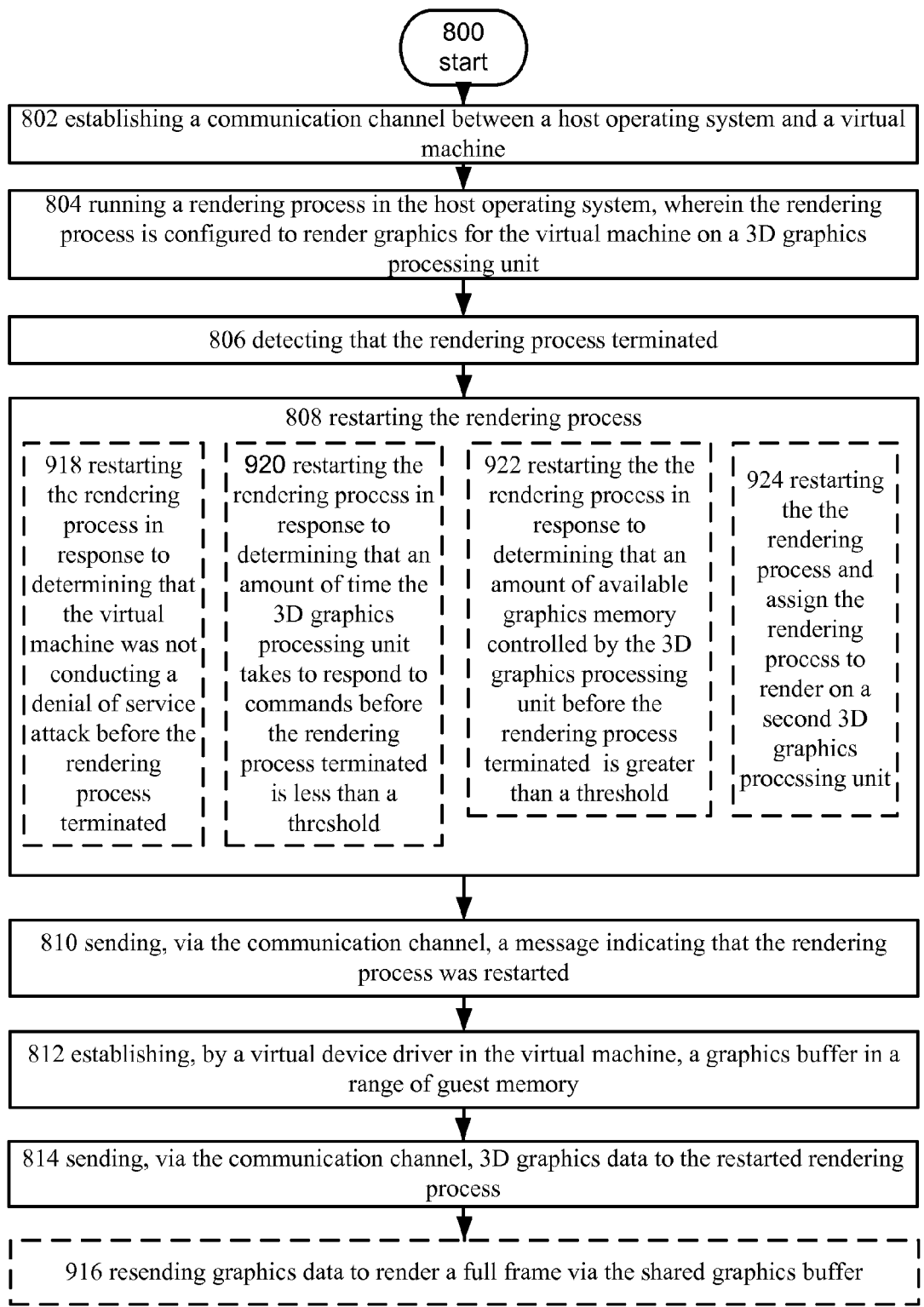
FIG. 9 illustrates the operational procedure of FIG. 8 including additional operations.

Turning to FIG. 9, it illustrates the operational procedure of FIG. 8 including the additional operations 916-924. Operation 916 shows sending graphics data to render a full frame via the graphics buffer. For example, after the graphics buffer, e.g., graphics aperture 526, is established, virtual device driver 518 can be configured to resend at least one full frame of graphics data. For example, virtual device driver 518 can keep track of what graphics data, e.g., the vertex data sent in DMA buffers, has been rendered and sent to client 520 and keep a copy of the vertex data until the rendered image is successfully sent to client 520. In this example, virtual device driver 518 can determine the identity of the last frame that was rendered and resend the graphics data needed to generate the next full frame.

Referring to operation 918, it shows restarting the rendering process in response to determining that the virtual machine was not conducting a denial of service attack before the rendering process terminated. For example, in an exemplary embodiment 3D graphics service manager 404 can be configured to determine whether graphics rendering module 506 terminated because of a denial of service attack by comparing the throughput through graphics aperture 526 prior to the termination to a throughput pattern that represents a typical denial of service attack. In the instant that the patterns do not match, 3D graphics service manager 404 can be configured to restart graphics rendering module 506.

Referring to operation 920, it shows restarting the rendering process in response to determining that an amount of time the 3D graphics processing unit takes to respond to commands before the rendering process terminated is less than a threshold. For example, in an exemplary embodiment 3D graphics service manager 404 can be configured to determine whether 3D GPU 504 was overloaded prior to 3D graphics rendering module 506 terminating before restarting graphics rendering module 506 by comparing the average latency associated with 3D GPU ACKs. After 3D graphics rendering module 506 terminates, 3D graphics service manager 404 can compare the average latency for hardware commands right before the termination to a threshold to determine whether the hardware was overcommitted. In the instance that the average latency is less than the threshold, 3D graphics service manager 404 can restart graphics rendering module 506.

Operation 922 shows restarting the rendering process in response to determining that an amount of available graphics memory controlled by the 3D graphics processing unit before the rendering process terminated is greater than a threshold. For example, in an exemplary embodiment 3D graphics service manager 404 can be configured to determine whether 3D GPU 504 was overloaded prior to termination before restarting graphics rendering module 506 by comparing the estimated amount of graphics memory available to the graphics processing unit to a threshold amount. 3D graphics service manager 404 can be configured to estimate how much graphics memory a virtual machine will attempt to use when it is started and store the value in a table. 3D graphics service manager 404 can then direct a graphics rendering module to bind to a 3D GPU and subtract the estimated amount of graphics memory from a value that reflects an estimate of the amount of available graphics memory. Prior to restarting the graphics rendering module, 3D graphics service manager 404 can be configured to compare the estimated amount of available graphics memory to a threshold and if the estimated value is greater than the threshold then 3D graphics service manager 404 can restart graphics rendering module 506. In the instance that the amount of available graphics memory is greater than a threshold, 3D graphics service manager 404 can restart graphics rendering module 506.

Turning to operation 924, it shows restarting the rendering process and assigning the rendering process to render on a second 3D graphics processing unit. For example, and referring to FIG. 5, in this embodiment 3D graphics service manager 404 can be configured to pass an identifier for a different GPU than the one that graphics rendering process 506 was rendering to cause the restarted graphics rendering process 506 to bind to a different GPU such as 3D GPU 504B. In this example, 3D graphics service manager 404 can be configured to move one or more virtual machines that were bound to the graphics processing unit that reset and caused the associated graphics rendering modules to termination in order to reduce the load on the GPU. For example, if virtual machines 414, 414B, and 414C were connected to 3D GPU 504 when it reset, 3D graphics service manager 404 can be configured to select one or more from the group and send the selected virtual machine(s) the device identifier for 3D GPU 504B and/or 3D GPU 504C. In this example, 3D graphics service manager 404 can use information such as the estimated amount of graphics memory used by each virtual machine and/or the average latency of direct memory access transactions to select which virtual machine to move.

Figure 10:
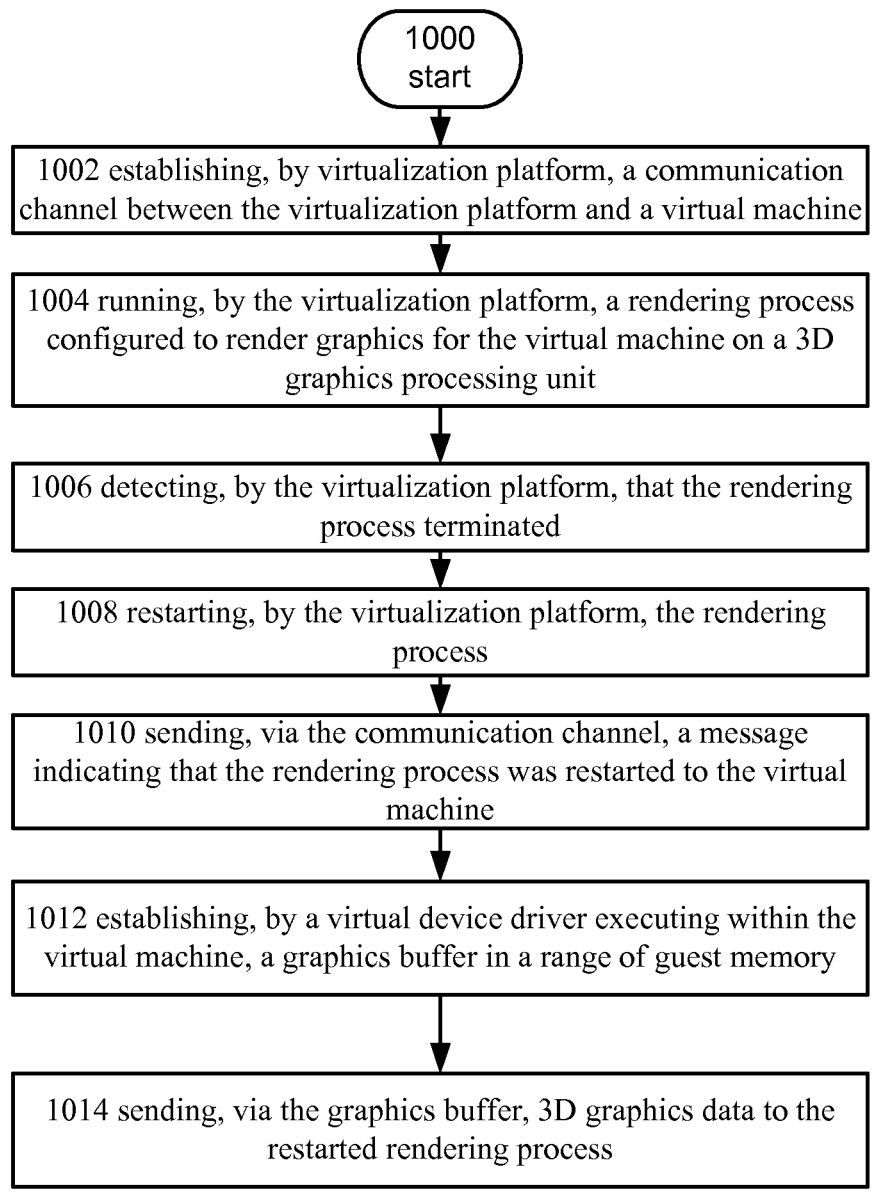
FIG. 10 depicts an operational procedure.

Referring now to FIG. 10, it illustrates an operational procedure for recovering from a graphics processing unit reset including operations 1000-1014. Operation 1000 begins the operational procedure and operation 1002 shows establishing, by virtualization platform, a communication channel between the virtualization platform and a virtual machine. For example, and turning to FIG. 5, in an exemplary embodiment a virtualization platform 402, e.g. hypervisor 302 of FIG. 3, can include 3D GPU service provider 512, e.g., a module of executable instructions, that upon execution by a processor can cause a device identifier to appear in memory mapped to IO devices in virtual machine 414. A plug-and-play module can detect the device identifier and load 3D GPU service client 514 in memory. 3D GPU service client 514 can execute on a virtual processor and allocate a group of pages of guest memory and setup communication channel 516 therein. 3D GPU service client 514 can send a connection request via communication channel 516 to 3D GPU service provider 512, which 3D GPU service provider 512 can accept.

Operation 1004 shows running, by the virtualization platform, a rendering process configured to render graphics for the virtual machine on a 3D graphics processing unit. For example, a connection request can be received by virtualization platform 400 to start virtual machine 414. In this example, a signal can be sent to 3D graphics service manager 404, which can also be a module of executable instructions that runs within kernel mode of the host operating system or within hypervisor 302 of FIG. 3, to start a graphics rendering process, e.g., a graphics rendering module such as graphics rendering module 506. 3D graphics service manager 404 can cause the host operating system to load graphics rendering module 506 and associate it with virtual machine 414.

Referring to operation 1006, it shows detecting, by the virtualization platform, that the rendering process terminated. For example, and turning back to FIG. 5, in an exemplary embodiment 3D graphics service manager 404 can receive a signal indicating that graphics rendering module 506 unexpectedly quit.

Turning to operation 1008, it shows restarting, by the virtualization platform, the rendering process. For example, 3D graphics service manager 404 can send a signal to the host operating system, or a scheduler of hypervisor 302 of FIG. 3, directing it to allocate resources to start an instance of graphics rendering module, i.e., graphics rendering module 506, for virtual machine 414. In this example, graphics rendering module 506 can be loaded into memory and 3D graphics service manager 404 can pass it configuration information such as the identity of the graphics processing unit to use. Graphics rendering module 506 can bind to the identified graphics processing unit and wait for a connection request from virtual machine 414.

Operation 1010 shows sending, via the communication channel, a message indicating that the rendering process was restarted to the virtual machine. Referring to FIG. 5, 3D graphics service manager 404 can execute on a processor and can cause a message to be sent to virtual machine 414 that indicates that a reset occurred. For example, 3D graphics service manager 404 can send a signal to 3D GPU service provider 512 and 3D GPU service provider 512 can write a message indicating that graphics rendering module 506 is restarting. 3D GPU service client 514 can receive the message via communication channel 516 and route the message to, for example virtual device driver 518.

Operation 1012 shows establishing, by a virtual device driver executing within the virtual machine, a graphics buffer in a range of guest memory. For example and turning to FIG. 5, in an exemplary embodiment virtual device driver 518 can receive a signal indicating that graphics rendering module 506 was restarted and can tear down the graphics buffer that it had been using to send transfer 3D data, e.g., vertices, textures, etc., from virtual machine 414 to virtualization platform 402 and create a new graphics buffer. For example, the graphics buffer can be implemented as a graphics aperture 526. In this example, virtual device driver 518 can allocate a range of guest memory addresses and pass the range to 3D GPU service client 514, which can send the range in a message to 3D GPU service provider 512. Graphics rendering module 506 can receive the range of memory addresses and send a signal to the hypervisor. Monolithic hypervisor 202, or hypervisor 302 of FIG. 3, can receive the signal and remap the range of guest memory addresses to system memory, i.e., memory allocated to virtualization platform 402, and start a process within the graphics buffer that passes DMA buffers of 3D data from virtual device driver 518 to graphics rendering module 506.

Operation 1014 shows sending, via the graphics buffer, 3D graphics data to the restarted rendering process. Virtual device driver 518 can send DMA buffers filled with vertices, textures, commands, etc., to graphics rendering module 506 via the graphics buffer, e.g., graphics aperture 526. Graphics rendering module 506 can receive the DMA buffers and send them to graphics kernel 508. Graphics kernel 508 can schedule their execution on a 3D graphics processing unit such as 3D GPU 504 and 3D GPU 504 can render images.

Figure 11:
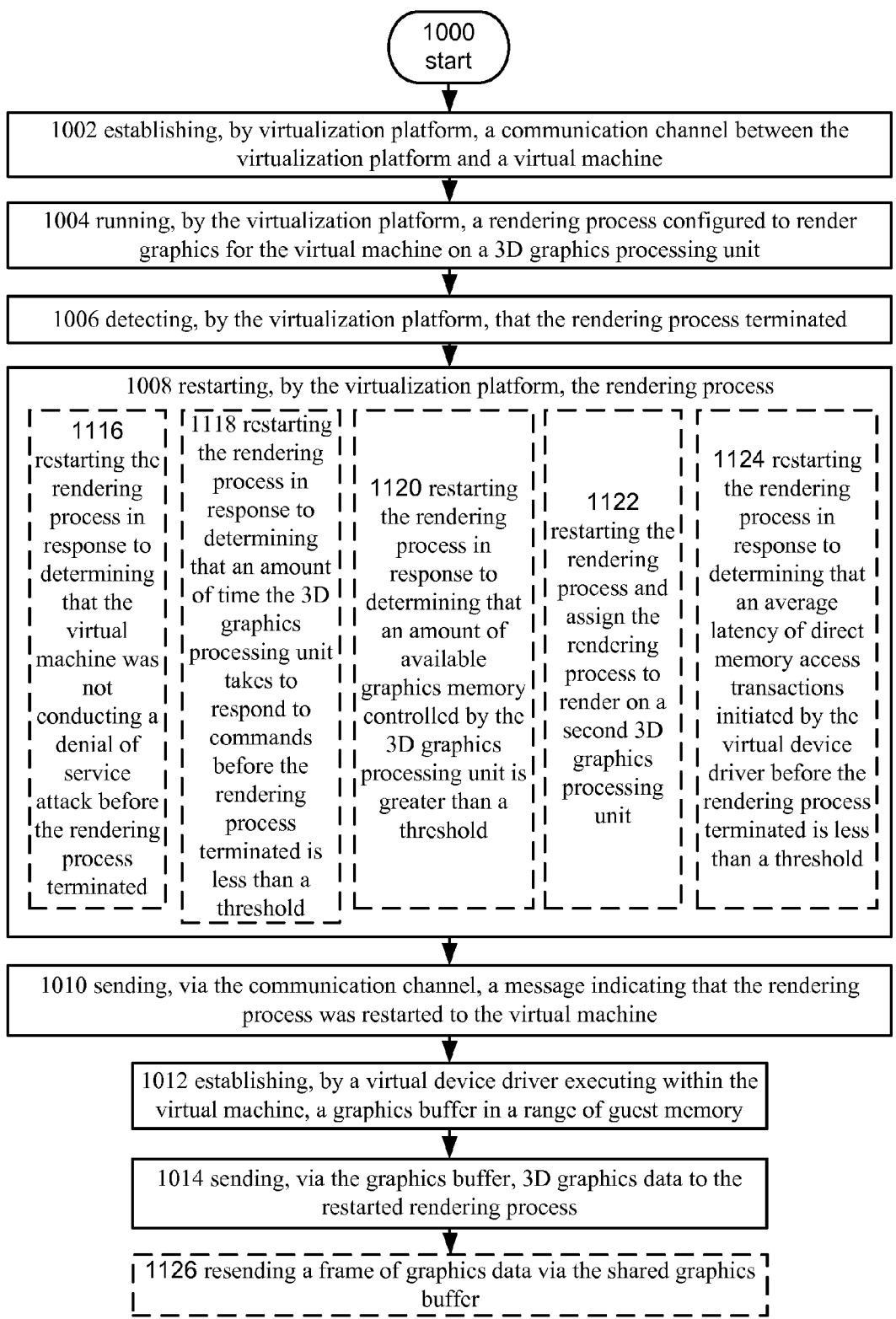
FIG. 11 illustrates the operational procedure of FIG. 10 including additional operations.

Referring now to FIG. 11, it shows the operational procedure of FIG. 10 including the additional operations 1116-1126. Operation 1116 shows restarting the rendering process in response to determining that the virtual machine was not conducting a denial of service attack before the rendering process terminated. For example, in an exemplary embodiment 3D graphics service manager 404 can be configured to determine whether graphics rendering module 506 terminated because of a denial of service attack by comparing the throughput through graphics aperture 526 prior to the termination to a throughput pattern that represents a typical denial of service attack. In the instant that the patterns do not match, 3D graphics service manager 404 can be configured to restart graphics rendering module 506. Otherwise, 3D graphics service manager 404 can take one or more of a plurality of actions such as restart 3D graphics service manager 404, disconnect client 520, send a signal to a process configured to notify an administrator of suspicious activity, etc.

Referring to operation 1118, it shows restarting the rendering process in response to determining that an amount of time the 3D graphics processing unit takes to respond to commands before the rendering process terminated is less than a threshold. Similar to the operations described above, in an exemplary embodiment 3D graphics service manager 404 can be configured to determine whether 3D GPU 504 was overloaded prior to the termination before restarting graphics rendering module 506 by comparing the average latency associated with 3D GPU ACKs. In the instance that the average latency is less than the threshold, 3D graphics service manager 404 can restart graphics rendering module 506.

Operation 1120 shows restarting the rendering process in response to determining that an amount of available graphics memory controlled by the 3D graphics processing unit is greater than a threshold. For example, in an exemplary embodiment 3D graphics service manager 404 can be configured to determine whether 3D GPU 504 was overloaded prior to the termination before restarting graphics rendering module 506 by comparing the estimated amount of graphics memory available to the graphics processing unit prior to the reset to a threshold amount. In the instance that the amount of available graphics memory is greater than a threshold, 3D graphics service manager 404 can restart graphics rendering module 506.

Operation 1122 shows restarting the rendering process and assign the rendering process to render on a second 3D graphics processing unit. For example, in an exemplary embodiment 3D graphics service manager 404 can be configured to determine whether 3D GPU 504 was overloaded before restarting graphics rendering module 506 by comparing the average latency associated with 3D GPU ACKs prior to the termination to a threshold amount. For example, graphics kernel 508 can be configured to start a timer each time it sends a hardware command to 3D graphics processing unit 504 and stop the timer when an ACK is received. The calculated time can then be sent to 3D graphics service manager 404, which can calculate the average time the 3D graphics processing unit takes to respond. After a termination, 3D graphics service manager 404 can compare the average latency for hardware commands right before the termination to a threshold to determine whether the hardware was overcommitted.

Operation 1124 shows restarting the rendering process in response to determining that an average latency of direct memory access transactions initiated by the virtual device driver before the rendering process terminated is less than a threshold. For example, in an exemplary embodiment 3D graphics service manager 404 can be configured to determine whether 3D GPU 504 was overloaded prior to the termination before restarting graphics rendering module 506. In this specific example embodiment, prior to restarting graphics rendering module 506, 3D graphics service manager 404 can be configured to determine if any of the virtual machines rendering to the GPU were responsible for causing 3D graphics processing unit 504 to be reset by compare the average latency of direct memory access transactions associated with the virtual machines to a threshold value. The latency of DMA transactions initiated by virtual machine 414 can be measured from the point in time where virtual device driver 518 receives a DMA buffer including a command for 3D GPU 504, until an ACK signal for the command is received by virtual device driver 518.

Operation 1126 shows resending a frame of graphics data via the graphics buffer. For example, and referring to FIG. 6, after the graphics buffer, e.g., graphics aperture 526, is established, virtual device driver 518 can be configured to resend at least one full frame of graphics data. For example, virtual device driver 518 can keep track of what graphics data, e.g., the vertex data sent in DMA buffers, has been rendered and sent to client 520 and keep a copy of the vertex data until the rendered image is successfully sent to client 520. In this example, virtual device driver 518 can determine the identity of the last frame that was rendered and resend the graphics data needed to generate the next full frame. For example, since some 3D graphics data is used for multiple frames, some data that may be used for the next frame may have already been sent to graphics rendering module 506. In this example, all the data used to create the next frame can be sent via the graphics buffer to ensure that graphics rendering module 506 can render the next frame.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer system configured to recover from a graphics processor reset, comprising:
   a processor;
   a 3D graphics processing unit; and
   a memory in communication with at least the processor when the computer system is operational, the memory having stored thereon computer readable instructions that upon execution cause the processor to:
      establish a communication channel between a virtualization platform and a virtual machine operating on the same computer system;
      detect that a rendering process configured to render graphics for the virtual machine on the 3D graphics processing unit terminated;
      restart the rendering process;
      send, via the communication channel, a signal indicating that the rendering process is being restarted to a virtual device driver executing in the virtual machine; and
      establish a graphics buffer between the virtual device driver executing in the virtual machine and the restarted rendering process.

2. The computer system of claim 1, wherein the computer readable instructions further comprise computer readable instructions that upon execution cause the processor to:
   resend graphics data to render a full frame via the graphics buffer.

3. The computer system of claim 1, wherein the computer readable instructions that upon execution cause the processor to restart the rendering process further comprise computer readable instructions that upon execution cause the processor to:
   restart the rendering process in response to determining that the virtual machine was not conducting a denial of service attack before the rendering process terminated.

4. The computer system of claim 1, wherein the computer readable instructions that upon execution cause the processor to restart the rendering process further comprise computer readable instructions that upon execution cause the processor to:
   restart the rendering process in response to determining that an average latency of direct memory access transactions initiated by the virtual device driver before the rendering process terminated is less than a threshold.

5. The computer system of claim 1, wherein the computer readable instructions that upon execution cause the processor to restart the rendering process further comprise computer readable instructions that upon execution cause the processor to:
   restart the rendering process in response to determining that an amount of time the 3D graphics processing unit takes to respond to commands before the rendering process terminated is less than a threshold.

6. The computer system of claim 1, wherein the computer readable instructions that upon execution cause the processor to restart the rendering process further comprise computer readable instructions that upon execution cause the processor to:
   restart the rendering process in response to determining that an estimated amount of available graphics memory controlled by the 3D graphics processing unit before the rendering process terminated is greater than a threshold.

7. The computer system of claim 1, wherein the computer readable instructions that upon execution cause the processor to restart the rendering process further comprise computer readable instructions that upon execution cause the processor to:
   restart the rendering process and assign the rendering process to render on a second 3D graphics processing unit.

8. A computer-readable storage device including computer readable instructions for recovering from a 3D graphics processing unit reset, the computer-readable storage medium comprising instructions that upon execution by a processor cause the processor to:
   establish a communication channel between a host operating system and a virtual machine;
   run a rendering process in the host operating system, wherein the rendering process is configured to render graphics for the virtual machine on a 3D graphics processing unit;
   detect that the rendering process terminated;
   restart the rendering process;
   send, via the communication channel, a message indicating that the rendering process was restarted;
   establish, by a virtual device driver in the virtual machine, a graphics buffer in a range of guest memory; and
   send, via the communication channel, 3D graphics data to the restarted rendering process.

9. The computer-readable storage device of claim 8, wherein the computer readable instructions that upon execution cause the processor to:
   resend graphics data to render a full frame via the graphics buffer.

10. The computer readable storage device of claim 8, wherein the computer readable instructions that upon execution cause the processor to restart the rendering process further comprise computer readable instructions that upon execution cause the processor to:
    restart the rendering process in response to determining that the virtual machine was not conducting a denial of service attack before the rendering process terminated.

11. The computer-readable storage device of claim 8, wherein the computer readable instructions that upon execution cause the processor to restart the rendering process further comprise computer readable instructions that upon execution cause the processor to:
    restart the rendering process in response to determining that an amount of time the 3D graphics processing unit takes to respond to commands before the rendering process terminated is less than a threshold.

12. The computer-readable storage device of claim 8, wherein the computer readable instructions that upon execution cause the processor to restart the rendering process further comprise computer readable instructions that upon execution cause the processor to:
    restart the rendering process in response to determining that an amount of available graphics memory controlled by the 3D graphics processing unit before the rendering process terminated is greater than a threshold.

13. The computer-readable storage device of claim 8, wherein the computer readable instructions that upon execution cause the processor to restart the rendering process further comprise computer readable instructions that upon execution cause the processor to:
    restart the rendering process and assign the rendering process to render on a second 3D graphics processing unit.

14. A method for recovering from a 3D graphics processing unit reset, comprising:
    establishing, by virtualization platform, a communication channel between the virtualization platform and a virtual machine;
    running, by the virtualization platform, a rendering process configured to render graphics for the virtual machine on a 3D graphics processing unit;
    detecting, by the virtualization platform, that the rendering process terminated;
    restarting, by the virtualization platform, the rendering process;
    sending, via the communication channel, a message indicating that the rendering process was restarted to the virtual machine;
    establishing, by a virtual device driver executing within the virtual machine, a graphics buffer in a range of guest memory; and
    sending, via the graphics buffer, 3D graphics data to the restarted rendering process.

15. The method of claim 14, further comprising:
restarting the rendering process in response to determining that the virtual machine was not conducting a denial of service attack before the rendering process terminated.

16. The method of claim 14, further comprising:
restarting the rendering process in response to determining that an amount of time the 3D graphics processing unit takes to respond to commands before the rendering process terminated is less than a threshold.

17. The method of claim 14, further comprising:
restarting the rendering process in response to determining that an amount of available graphics memory controlled by the 3D graphics processing unit is greater than a threshold.

18. The method of claim 14, further comprising:
restarting the rendering process and assign the rendering process to render on a second 3D graphics processing unit.

19. The method of claim 14, further comprising:
restarting the rendering process in response to determining that an average latency of direct memory access transactions initiated by the virtual device driver before the rendering process terminated is less than a threshold.

20. The method of claim 14, further comprising:
resending a frame of graphics data via the graphics buffer.

\* \* \* \* \*